No. 634,562.  
F. PAGNON.  
BRICK.  
(Application filed May 26, 1899.)  
Patented Oct. 10, 1899.

(No Model.)

WITNESSES:  
Ella L. Giles  
Ottman

INVENTOR  
Filis Pagnon  
BY  
Richards  
ATTORNEYS

UNITED STATES PATENT OFFICE.

FELIX PAGNON, OF LYONS, FRANCE.

BRICK.

SPECIFICATION forming part of Letters Patent No. 634,562, dated October 10, 1899.

Application filed May 26, 1899. Serial No. 718,428. (No model.)

*To all whom it may concern:*

Be it known that I, FELIX PAGNON, a citizen of France, residing at Lyons, France, have invented certain new and useful Improvements in Bricks, of which the following is a full, clear, and exact description, and for which I have made application for a patent in France, numbered 282,695, dated November 3, 1898.

My invention consists of a bonding or interfitting brick or tile of special form decorated on one of its faces or upon its two faces and capable of being used without the use of plaster, cement, mortar, and any other material tempered with water. In the construction of partitions and other works it consequently avoids the use of coatings of these materials covering the partitions themselves and enables works thus constructed to be used immediately.

The accompanying drawings show the arrangement of these new bricks or tiles and the method of assembling them.

Figure 1:
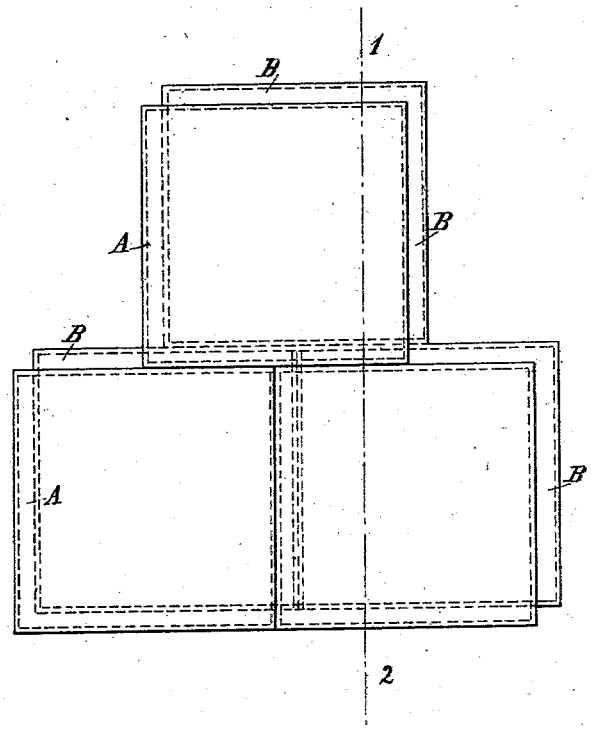
Figure 2:
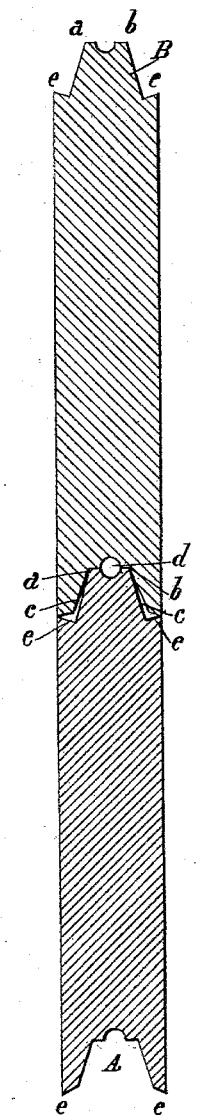

Figure 1 represents a face view of three square bricks as placed together. Fig. 2 shows to a larger scale a transverse section on the line 1 2 of Fig. 1.

The square or rectangular brick shown in Fig. 1 has formed in two of its adjacent sides channels or grooves A A and upon the two other sides tongues or projections B B for the purpose of interfitting or bonding, as seen in section at Fig. 2. The tongues or projections and the channels or grooves have somewhat the same trapezoidal section; but although the small base $a\,b$ of the tongue fits exactly the base of the channel or groove its larger base leaves a certain amount of play $c\,c$, which facilitates the assembling. Further, the small faces $e\,e$, which limit the visible faces of the brick, are inclined inward, thus forming a small space which adjoins the space $c$. The small base $a\,b$ of the tongue or projection and the bottom of the channel or groove are each provided with a small semicircular groove, the junction of which forms a cylindrical hollow $d$. The objects of these forms are, first, in constructing partitions upon relatively narrow bases to prevent the irregularities which would result from imperfect contact of large surfaces and to assure the junction of the visible faces of the bricks; second, to superpose exactly these faces in the same plane by the exact adjustment of the part $a\,b$ in the bottom of the channel or groove, and, third, to consolidate, when desirable, the whole wall and to render it water-tight by the introduction of a plastic material in the spaces $c\,d\,e$ without this material showing upon the visible faces of the bricks.

These bricks may be assembled with their meeting edges in straight lines or so as to break joint, their two faces may be polished, enameled, and decorated in course of manufacture and remain bare after the construction of the walls, or they may be assembled and without any previous coating they may be covered with thin boards or wall-paper, as desired. These bricks enable in every case a rapid construction without any inconvenience and the immediate use of the works to which they have been applied.

Having fully described my invention, what I claim, and desire to secure by Letters Patent, is—

1. A brick having a tongue extending from one of its sides and a groove in its side opposite thereto, said tongue being adapted to interlock with the groove in the contiguous block, the side walls of the tongues tapering and the side walls of the grooves tapering to a greater degree to provide a space between the walls of said groove and said tongue, substantially as described.

2. A bonding-brick having a trapezoidal tongue or projection on one of its sides the small base of which is of size to fit the bottom of a trapezoidal channel or groove formed in another of its sides, the said small base and bottom of the channel each having a semicircular groove, and the sides of the trapezoidal tongue and channel being connected to the outer faces of the brick by means of short inclines, substantially as herein shown and described.

3. A brick having a tongue extending from one edge thereof with inclined side walls and surfaces at the base of said tongue inclining forwardly toward the side of the brick and a groove A in the opposite edge of the brick having corresponding but reversely-inclined walls and surfaces, substantially as described.

In testimony whereof I affix my signature in presence of two witnesses.

FELIX PAGNON.

Witnesses:
GASTON JEANNIOUO,
M. VACHOZ.